United States Patent
Kato et al.

(10) Patent No.: US 7,055,645 B2
(45) Date of Patent: Jun. 6, 2006

(54) METHOD AND DEVICE FOR CONTROLLING MANEUVERABILITY OF VEHICLE

(75) Inventors: Hiroaki Kato, Aichi-ken (JP); Minekazu Momiyama, Aichi-ken (JP); Yoshiyuki Yasui, Aichi-ken (JP); Wataru Tanaka, Aichi-ken (JP); Kenji Asano, Aichi-ken (JP); Yuzou Imoto, Aichi-ken (JP); Eiichi Ono, Aichi-ken (JP); Yuji Muragishi, Aichi-ken (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 10 days.

(21) Appl. No.: 10/507,374

(22) PCT Filed: Apr. 21, 2003

(86) PCT No.: PCT/JP03/05073

§ 371 (c)(1),
(2), (4) Date: Sep. 21, 2004

(87) PCT Pub. No.: WO03/091085

PCT Pub. Date: Nov. 6, 2003

(65) Prior Publication Data

US 2005/0167181 A1    Aug. 4, 2005

(30) Foreign Application Priority Data

Apr. 26, 2002 (JP) ............................. 2002-126716

(51) Int. Cl.
 *B62D 5/04* (2006.01)
(52) U.S. Cl. .................................................... 180/443
(58) Field of Classification Search ................ 180/443, 180/444, 446
See application file for complete search history.

(56) References Cited

U.S. PATENT DOCUMENTS

| | | | | |
|---|---|---|---|---|
| 6,199,654 | B1 * | 3/2001 | Kojo et al. ................. | 180/443 |
| 6,926,114 | B1 * | 8/2005 | Bolourchi et al. .......... | 180/422 |
| 2004/0193346 | A1 * | 9/2004 | Sugiyama .................... | 701/42 |
| 2005/0023072 | A1 * | 2/2005 | Kodama et al. ............ | 180/402 |

FOREIGN PATENT DOCUMENTS

| | | |
|---|---|---|
| JP | 5-105103 | 4/1993 |
| JP | 10-315998 | 12/1998 |
| JP | 11-1175 | 1/1999 |

(Continued)

*Primary Examiner*—Tony Winner
(74) *Attorney, Agent, or Firm*—Oblon, Spivak, McClelland, Maier & Neustadt, P.C.

(57) ABSTRACT

In accordance with a vehicle motion control apparatus, a steering angle (θh) of a steering wheel is determined on the basis of a rotation angle (θpm) of an assist motor (24m) detected by a rotation angle sensor (24s) and a rotation angle (θvm) of a gear ratio variable motor (32m) detected by a rotation angle sensor (32s), and a VGRS control process (40a) of a gear ratio variable mechanism is executed on the basis of the determined steering angle (θh). Accordingly, since the steering angle (θh) of the steering wheel is determined on the basis of the rotation angle (θvm) used for the VGRS control process (40a) of the gear ratio variable mechanism and the rotation angle (θpm) used for an EPS control process (30a) of an EPS actuator, it is possible to obtain the steering angle (θh) of the steering wheel without a steering angle sensor. Therefore, it is possible to reduce the number of the parts of a vehicle motion control apparatus.

4 Claims, 5 Drawing Sheets

FOREIGN PATENT DOCUMENTS

| | | |
|---|---|---|
| JP | 11-78945 | 3/1999 |
| JP | 2000-62632 | 2/2000 |
| JP | 2001-138936 | 5/2001 |
| JP | 2003-137125 | 5/2003 |

\* cited by examiner

METHOD AND DEVICE FOR CONTROLLING MANEUVERABILITY OF VEHICLE

CROSS-REFERENCE TO RELATED APPLICATION

The present application claims priority under 35 U.S.C. § 119 to Japanese Patent Application No. JP 2002-126716. The contents of these applications are incorporated herein by reference.

TECHNICAL FIELD

The present invention relates to motion control method of vehicle and motion control apparatus of vehicle.

DESCRIPTION OF RELATED ART

As a vehicle motion control apparatus including a transmission ratio changing mechanism for changing the transmission ratio by driving a gear ratio variable motor, provided a way of a steering transmission system which connects a steering wheel to steered wheels, a vehicle motion control apparatus 100 which comprises a steering wheel 21, a first steering shaft 22, a second steering shaft 23, an EPS actuator 24, rods 25, a steering angle sensor 26, a vehicle velocity sensor 27, a torque sensor 28, an EPS_ECU 30, a gear ratio changing mechanism 32, a VGRS_ECU 40 and the like, as shown in FIG. 4 and FIG. 5, is available. In the meantime, such "a transmission ratio changing mechanism for changing a transmission ratio by driving an electric motor, located halfway of a steering transmission system which connects the steering wheel 21 to the steered wheels" is sometimes called variable gear ratio system (referred to as VRS, hereinafter) depending on a case.

That is, an end of the first steering shaft 22 is connected to the steering wheel 21 and an input side of the gear ratio changing mechanism 32 is connected to the other end side of this first steering shaft 22. This gear ratio changing mechanism 32 comprises a gear ratio variable motor 32$m$, a reduction gear 32$g$ and the like. An end side of the second steering shaft 23 is connected to this output side of the gear ratio changing mechanism and an input side of the EPS actuator 24 is connected to the other end side of the second steering shaft 23. The EPS actuator 24 is an electric type powered steering system, which is capable of converting a rotary motion inputted by the second steering shaft 23 through a rack and pinion gear (not shown) and the like to a motion in the axial direction of the rods 25 and outputting it. Further, this EPS actuator 24 generates an assist force depending on a steering condition by means of an assist motor 24$m$ which is controlled by the EPS_ECU 30 so as to assist steering by a driver. A rotation angle (steering angle) of the first steering shaft 22 is detected by a steering angle sensor 26 and inputted to the VGRS_ECU 40 as a steering angle signal θh. A steering torque by the second steering shaft 23 is detected by a torque sensor 28 and inputted to the EPS control process 30$a$ as a torque signal Tp. Further, a vehicle velocity is detected by a vehicle velocity sensor 27 and inputted to the EPS_ECU 30 and VGRS_ECU 40 as a vehicle velocity signal V. Further, steered wheels (not shown) are attached to the rods 25.

With such a structure, ratio between input gear and output gear is changed depending on vehicle velocity at real time by means of a gear ratio variable motor 32$m$ and reduction gear 32$g$ in the gear ratio changing mechanism 32 and VGR-S_ECU 40 so as to change a ratio of output angle of the second steering shaft 23 relative to the steering angle of the first steering shaft 22. The EPS actuator 24 and the EPS_ECU 30 generate an assist force for assisting steering of the vehicle driver by means of an assist motor 24$m$ depending on vehicle driver's steering condition and vehicle velocity detected by means of the torque sensor 28 and the vehicle velocity sensor 27.

Consequently, the steering gear ratio corresponding to the vehicle velocity can be set. For example, an output angle by the gear ratio changing mechanism 32 can be set to be increased with respect to the steering angle of the steering wheel 21 at the time of vehicle stopping or traveling at a low velocity. Further, the output angle of the gear ratio changing mechanism 32 can be set to be decreased with respect to the steering angle of the steering wheel 21 at the tite of traveling at a high velocity. Meanwhile, an appropriate assist force corresponding to the vehicle velocity can be generated by means of an assist motor 24$m$.

For example, if a vehicle is stopping or traveling at a low velocity, the steering gear ratio by the gear ratio changing mechanism 32 is set low and an assist force is intensified by an assist motor 24$m$, so that the steered wheels can be steered largely even with a light steering operation. This facilitates the steering operation of a vehicle driver. On the other hand, if the vehicle is traveling at a high velocity, the assist force by the assist motor 24$m$ drops and the steering ratio by the gear ratio changing mechanism 32 is set high. Consequently, the steering operation becomes heavy and even if the steering wheel is turned largely, it comes that the steered wheels are steered a little. Consequently, it can be expected that vehicle control stability is further improved.

However, in a vehicle motion control apparatus 100 mentioned above, as shown in FIG. 5, a lot of sensors such as a steering angle sensor 26, a vehicle velocity sensor 27, a torque sensor 28 and the like are employed in addition to a rotation angle sensor 24$s$ of an assist motor 24$m$ and a rotation angle sensor 32$s$ of a gear ratio variable motor 32$m$. Accordingly, in the vehicle motion control apparatus 100, an increase of a product cost is caused by heavy usage of these sensors, and there is further a problem that a reduction in a trouble incidence rate is prevented.

On the other hand, taking a motion control performance of the vehicle into consideration, there is a problem that a control performance of an EPS control process 30$a$ and a VGRS control process 40$a$ is lowered, a control itself is disabled due to roughness of detection data, in the case of employing a countermeasure such as simply replacing by an inexpensive sensor having a low resolution, reducing the sensors or the like.

The present invention is made for the purpose of solving the problems mentioned above, and an object of the present invention is to provide a motion control method of a vehicle and a motion control apparatus of a vehicle which can reduce a number of parts.

Further, another object of the present invention is to provide a motion control method of a vehicle and a motion control apparatus of a vehicle which can improve a motion control performance of the vehicle.

DISCLOSURE OF THE INVENTION

In order to achieve the above objects, according to claim 1, a motion control method of a vehicle provided with a transfer ratio variable mechanism for changing a transfer ratio by driving a gear ratio variable motor, and an assist motor assisting a steering force on the basis of a steering torque generated in an output shaft of the transfer ratio variable mechanism, in the middle of a steering transfer system connecting a steering wheel and steered wheels, comprising:

a first step of detecting a rotation angle θpm of said assist motor;

a second step of detecting a rotation angle θvm of said gear ratio variable motor; and a third step of determining a steering angle of said steering wheel on the basis of the rotation angle θpm detected in accordance with said first step and the rotation angle θvm detected in accordance with said second step, wherein said transfer ratio variable mechanism is controlled on the basis of the steering angle of said steering wheel determined in accordance with said third step.

In accordance with a first aspect of the present invention, a steering angle of a steering wheel is determined on the basis of a rotation angle θpm detected in accordance with a first step and a rotation angle θvm detected by a second step, and a transfer ratio variable mechanism for changing a transfer ratio of a steering transfer system is controlled on the basis of the determined steering angle of the steering wheel. Accordingly, since the steering angle of the steering wheel is determined on the basis of the rotation angle θvm used for controlling the gear ratio variable motor and the rotation angle θpm used for controlling the assist motor, it is possible to obtain the steering angle of the steering wheel without any part for mechanically or electrically detecting the steering angle such as the steering angle sensor or the like. Therefore, since the part for detecting the steering angle mentioned above can be abolished, it is possible to reduce the number of the parts.

According to claim 2, a motion control method of a vehicle as claimed in claim 1, wherein the rotation angle is input via the speed reducing means to at least one of the detection of the rotation angle θpm in accordance with said first step and the rotation angle θvm in accordance with said second step.

In accordance with a second aspect of the present invention, since the rotation angle is input via the speed reducing means in the detection of the rotation angles θpm and θvm, it is possible to improve a resolution of the input rotation angles θpm and θvm. Accordingly, since it is possible to determine the steering angle of the steering wheel on the basis of the rotation angles θpm and θvm having the high resolution in the third step described in the first aspect, it is possible to improve the resolution of the determined steering angles. Therefore, since the control of the transfer ratio variable mechanism is executed on the basis of the steering angle of the steering wheel having the high resolution, it is possible to improve a motion control performance of the vehicle.

According to claim 3, a motion control apparatus of a vehicle provided with a transfer ratio variable mechanism for changing a transfer ratio by driving a gear ratio variable motor, and an assist motor assisting a steering force on the basis of a steering torque generated in an output shaft of the transfer ratio variable mechanism, in the middle of a steering transfer system connecting a steering wheel and steered wheels, comprising:

a first rotation angle detecting means for detecting a rotation angle θpm of said assist motor;

a second rotation angle detecting means for detecting a rotation angle θvm of said gear ratio variable motor; and a steering angle computing means for determining a steering angle of said steering wheel on the basis of the rotation angle θpm detected by said first rotation angle detecting means and the rotation angle θvm detected by said second rotation angle detecting means, wherein said transfer ratio variable mechanism is controlled on the basis of the steering angle of said steering wheel determined by said steering angle computing means.

In accordance with a third aspect of the present invention, a steering angle of a steering wheel is determined on the basis of a rotation angle θpm detected by a first rotation angle detecting means and a rotation angle θvm detected by a second rotation angle detecting means, and a transfer ratio variable mechanism for changing a transfer ratio of a steering transfer system is controlled on the basis of the determined steering angle of the steering wheel. Accordingly, since the steering angle of the steering wheel is determined on the basis of the rotation angle θvm used for controlling the gear ratio variable motor and the rotation angle θpm used for controlling the assist motor, it is possible to obtain the steering angle of the steering wheel without any part for mechanically or electrically detecting the steering angle such as the steering angle sensor or the like. Therefore, since the part for detecting the steering angle mentioned above can be abolished, it is possible to reduce the number of the parts.

According to claim 4, a motion control method of a vehicle as claimed in claim 3, wherein the rotation angle is input via the speed reducing means to at least one of said first rotation angle detecting means and said second rotation angle detecting means.

In accordance with a fourth aspect of the present invention, since the rotation angle is input via the speed reducing means to the first and second rotation angle detecting means, it is possible to improve a resolution of the input rotation angles. Accordingly, since it is possible to determine the steering angle of the steering wheel on the basis of the rotation angles θpm and θvm having the high resolution in the steering angle computing means described in the third aspect, it is possible to improve the resolution of the determined steering angles. Therefore, since the control of the transfer ratio variable mechanism is executed on the basis of the steering angle of the steering wheel having the high resolution, it is possible to improve a motion control performance of the vehicle.

BEST MODE FOR CARRYING OUT THE INVENTION

Figure 1:
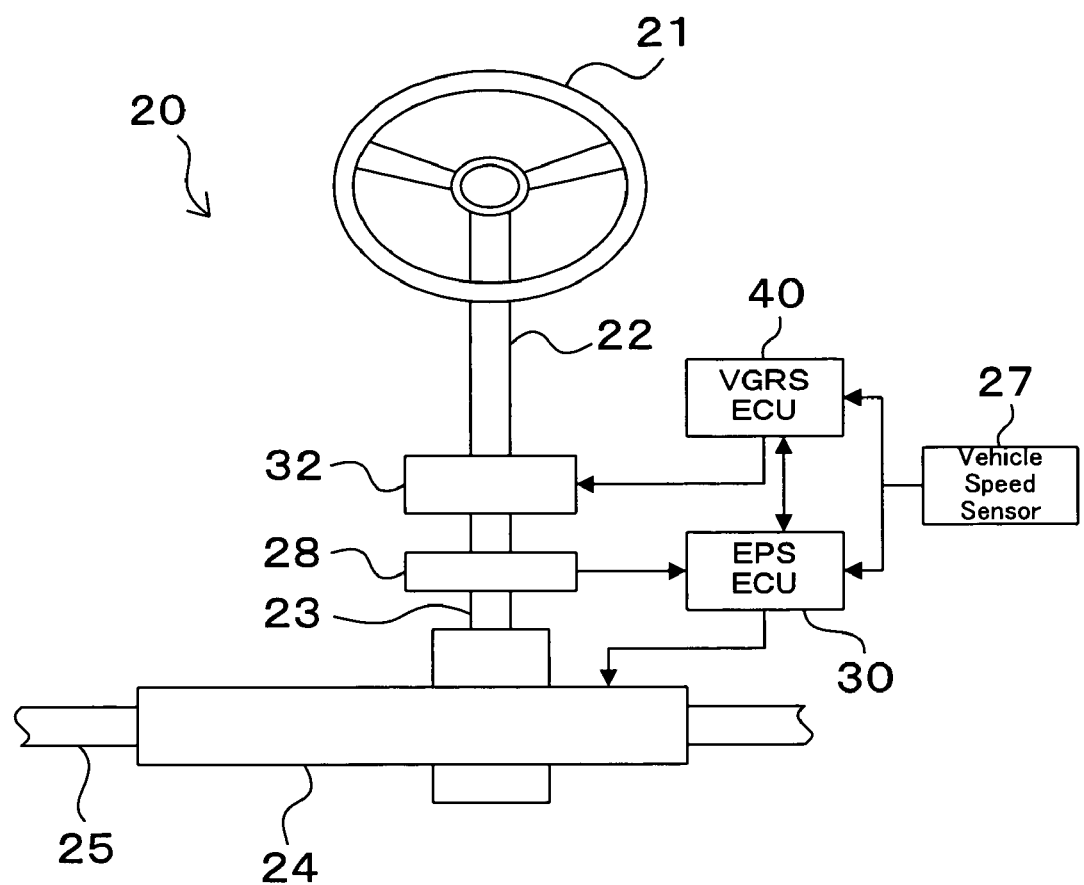
FIG. 1 is a schematic view showing a summary of a structure of a vehicle motion control apparatus.

Descriptions will be given below of an embodiment of a motion control method of a vehicle of the present invention and a vehicle motion control apparatus to which the motion control apparatus of the vehicle is applied. In this case, a vehicle motion control apparatus 20 of the present embodiment is the same in a mechanical structure as the vehicle motion control apparatus 100 mentioned above except the structure that the steering angle sensor 26 is deleted from the vehicle motion control apparatus 100. Accordingly, in the vehicle motion control apparatus 20 shown in FIG. 1, the same reference numerals are attached to the same structure portions as those of the vehicle motion control apparatus 100 shown in FIG. 4, and a description thereof will be emitted.

Figure 2:
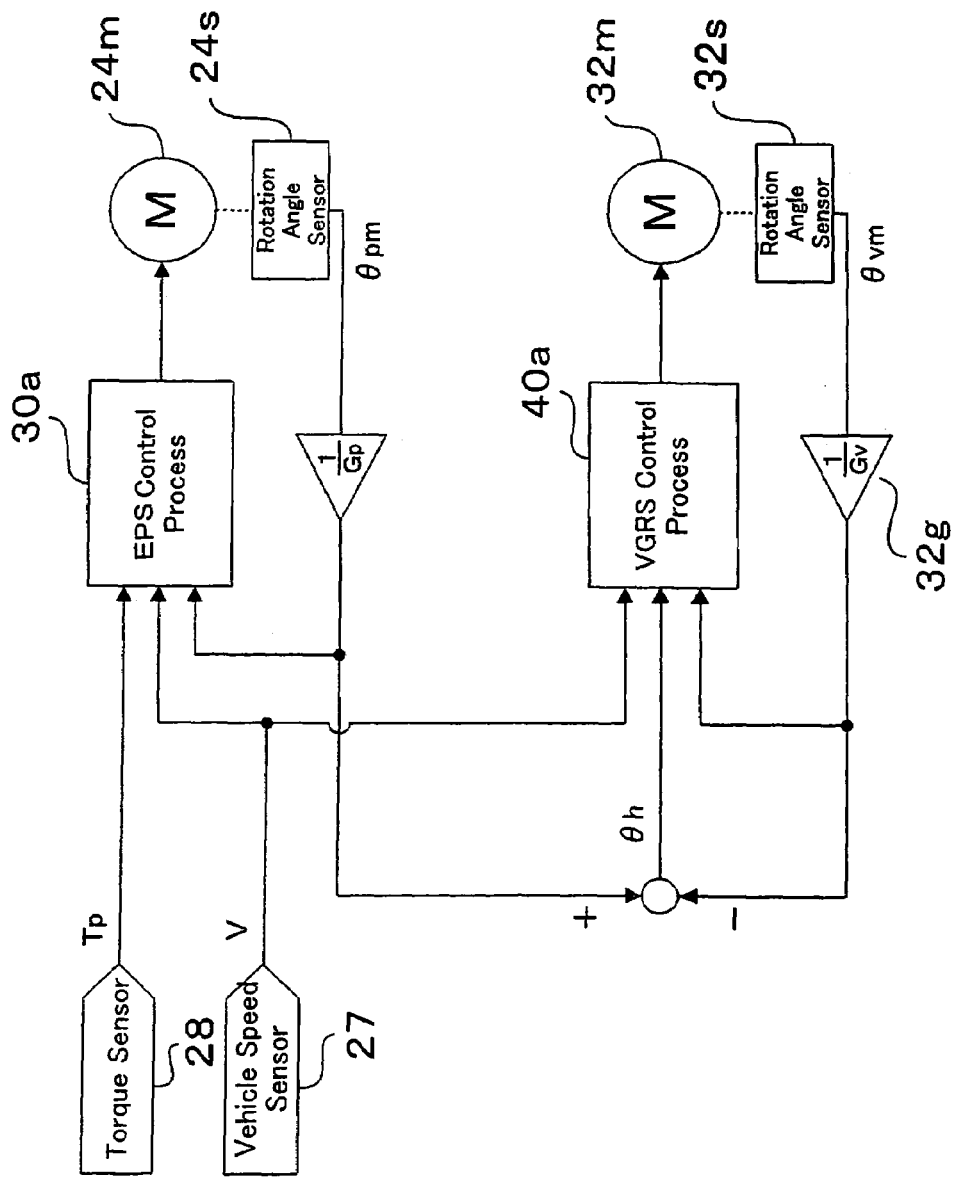
FIG. 2 is a function block diagram expressing a vehicle motion control process in accordance with EPS_ECU and VGRS_ECU of a vehicle motion control apparatus of the present embodiment.

As shown in FIG. 2, in the vehicle motion control apparatus 20 of this embodiment, two processings, that is, an EPS control process 30a by the EPS_ECU 30 and VGRS control process 40a by the VGRS_ECU 40 are carried out by an electronic control unit (ECU). That is, the vehicle motion control apparatus 20 has a function for controlling the steering gear ratio by means of the gear ratio changing mechanism 32 according to VGRS control process 40a with the VGRS_ECU 40, depending on the vehicle velocity. Further, it has a function of assisting steering by the vehicle driver by generating an assist force depending on steering condition by means of the EPS control process 30a with the EPS_ECU 30.

Accordingly, in a VGRS control process 40a, a vehicle velocity signal V generated by a vehicle velocity sensor 27 and a steering angle θh detected by computing as described later are input to a VGRS_ECU 40, whereby there is executed a process of determining a rotation angle of a gear ratio variable motor 32m in a gear ratio variable mechanism 32 uniquely defined in correspondence to a vehicle velocity on the basis of a motor rotation angle map (not shown), and a motor voltage in correspondence to a determined rotation angle command value is supplied to the gear ratio variable motor 32m in accordance with a motor drive circuit. Therefore, in the gear ratio variable mechanism 32 and the VGRS_ECU 40, a ratio of an output gear with respect to an input gear is changed in real time in correspondence to a vehicle velocity by the gear ratio variable motor 32m and a reduction gear 32g.

Further, in an EPS control process 30a, a steering torque signal Tp generated by a torque sensor 28 and the vehicle velocity signal V generated by the vehicle velocity sensor 27 are input to an EPS_ECU 30, whereby there is executed a process of determining a current command value of an assist motor 24m in an EPS actuator 24 uniquely defined in correspondence to the vehicle velocity on the basis of a motor current map (not shown), and a motor voltage in correspondence to a determined current command value is supplied to the gear ratio variable motor 32m in accordance with a motor drive circuit. Therefore, in the EPS actuator 24 and the EPS_ECU 30, by EPS control process 30a, an assist force for assisting the steering operation of the driver is generated by the assist motor 24m, in correspondence to a steering state of the driver and a vehicle velocity which are detected by the torque sensor 28 and the vehicle velocity sensor 27.

Respective function summaries of each of an EPS control process 30a by the EPS_ECU 30 and a VGRS control process 40a by the VGRS_ECU 40 are basically the same as the vehicle motion control process by the vehicle motion control apparatus 100 mentioned above. However, the vehicle motion control apparatus 20 of the present embodiment is different from the conventional vehicle motion control apparatus 100 in a point that a steering angle θh is determined in accordance with a computing process by the VGRS_ECU 40 in place of using the value detected by the steering angle sensor, and the computed value is used for a VGRS control process 40a.

Figure 4:
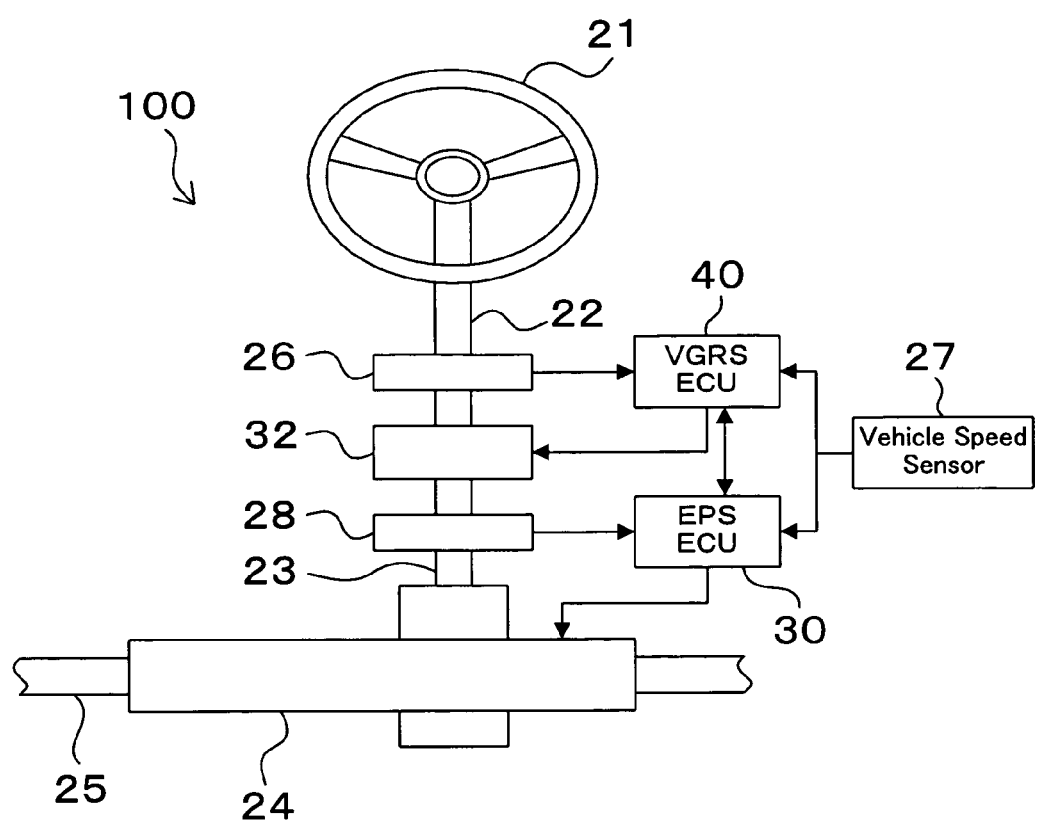
FIG. 4 is a schematic view showing a summary of a structure of a conventional vehicle motion control apparatus.
Figure 5:
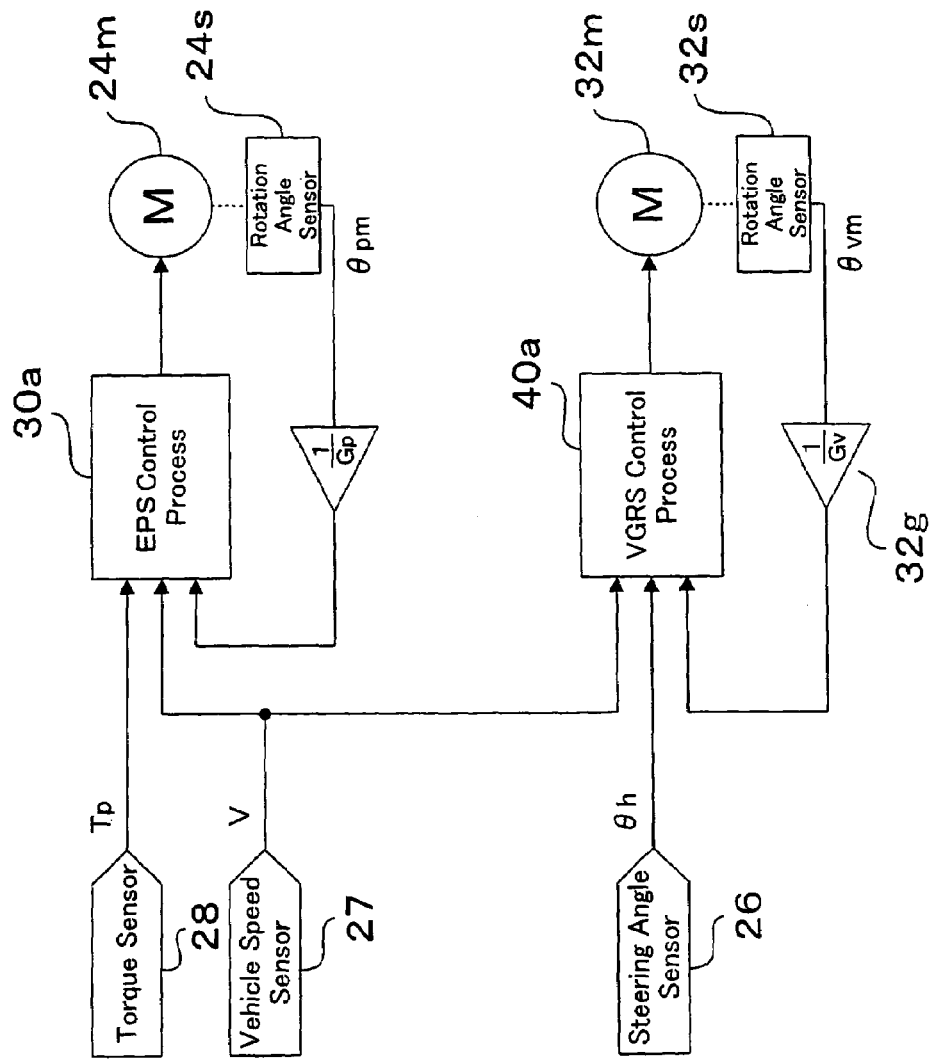
FIG. 5 is a function block diagram of the conventional vehicle motion control apparatus.

In other words, as shown in FIGS. 4 and 5, in the vehicle motion control apparatus 100, the steering angle θh of the steering wheel 21 is mechanically or electrically detected by the steering angle sensor 26, and the steering angle θh is used for the VGRS control process 40a. On the contrary, in the vehicle motion control apparatus 20, as shown in FIG. 2, the steering angle θh of the steering wheel 21 is determined on the basis of a rotation angle θpm detected by a rotation angle sensor 24s and a rotation angle θvm detected by a rotation angle sensor 32s, and the VGRS control process 40a is executed on the basis of the determined steering angle θh. Accordingly, the steering angle sensor 26 is not required.

In specific, since a relation on the basis of the following formula (1) is established between the steering angle θh of the steering wheel 21, the rotation angle θpm of the assist motor 24m and the rotation angle θvm of the gear ratio variable motor 32m, the steering angle θh is determined by executing an arithmetic process of determining the steering angle θh of the steering wheel 21 from the formula (1) on the basis of a formula (2) by means of the VGRS_ECU 40.

$$\theta h + \theta vm/Gv = \theta pm/Gp \quad (1)$$

$$\theta h = \theta pm/Gp - \theta vm/Gv \quad (2)$$

In the above formulas, Gv is a gear ratio (no-unit number) by the gear ratio variable mechanism 32 and is set by the VGRS control process 40a. Further, Gp is a gear ratio (no-unit number) by the EPS actuator 24 and is set by the EPS control process 30a.

In the present embodiment, the arithmetic process on the basis of the formula (2) is executed in accordance with the steering angle computing process which is repeatedly executed at fixed intervals (for example, every five millisecond) of a predetermined timer interrupt processing or the like, for example, by the VGRS_ECU 40. Then, a description will be given of a summary of the steering angle computing process on the basis of FIG. 3.

Figure 3:
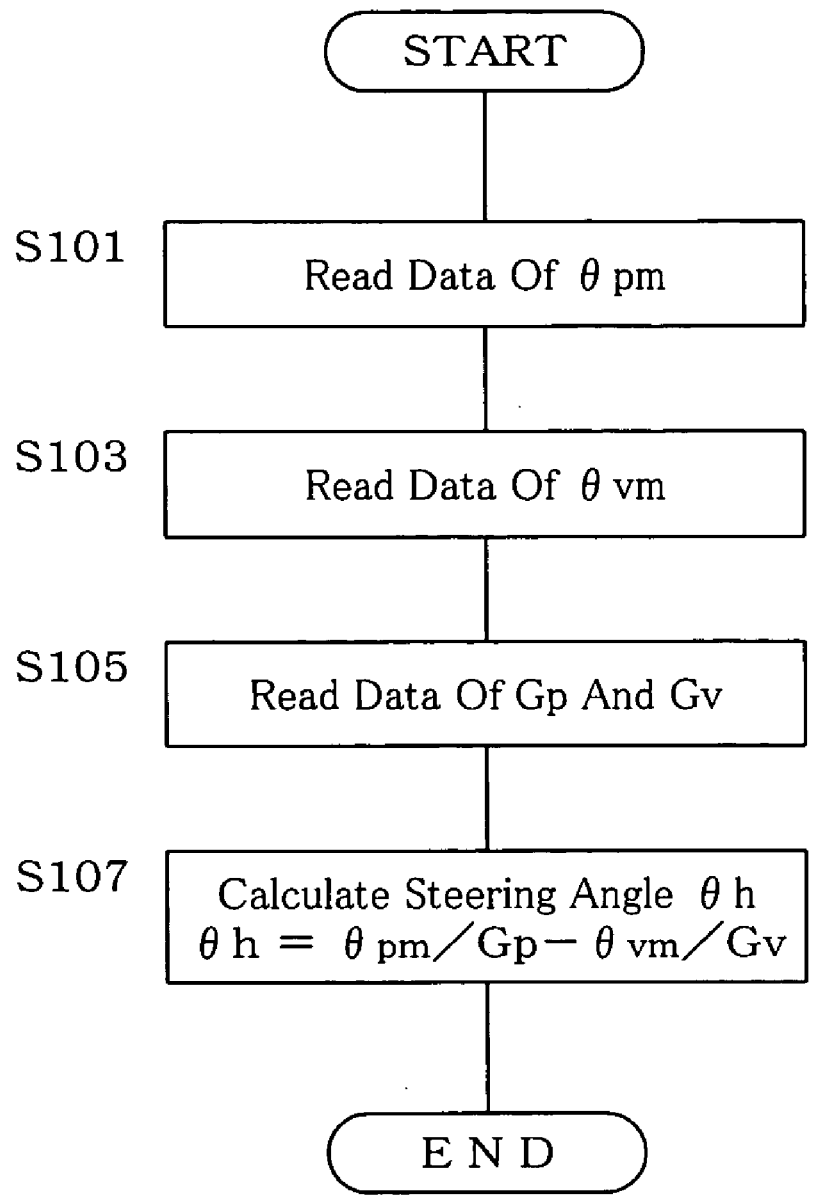
FIG. 3 is a flow chart showing a flow of a steering angle computing process in accordance with VGRS_ECU of the vehicle motion control apparatus of the present embodiment.

As shown in FIG. 3, in the steering angle computing process, a process of reading data of the rotation angle θpm of the assist motor 24m is first executed by a step S101 after a predetermined initializing process. Since the data of the rotation angle θpm is detected by the rotation angle sensor 24s and input to the VGRS_ECU 40, a data reading is executed by reading the data in accordance with a proper interrupt processing or the like.

Next, a process of reading the data of the rotation angle θvm of the gear ratio variable motor 32m is executed by a step S103. Since the data of the rotation angle θvm is detected by the rotation angle sensor 32s and input to the VGRS_ECU 40, a data reading is executed by reading the data in accordance with a proper interrupt processing or the like in the same manner as that of the data of the rotation angle θpm.

In the succeeding step S105, a process of reading the data of the gear ratios Gp and Gv is executed. The gear ratio Gp is obtained by multiplying a gear ratio generated by a ball screw interposing between an output shaft of the gear ratio variable motor 32m and a rack shaft, by a gear ratio generated by a pinion gear engaged with a rack of the rack shaft, and is set by a design value or a measured value. Further, the gear ratio Gv is set on the basis of a parameter determined by the VGRS control process 40a.

In this case, the gear ratio obtained by multiplying the gear ratio generated by the ball screw interposing between the output shaft of the assist motor 24m and the rack shaft, by the gear ratio generated by the pinion gear engaged with the rack of the rack shaft corresponds to a reduction gear ratio serving as a reduction gear interposing in an input side of the rotation angle sensor 24s.

Since all of the parameters required for determining the steering angle θh from the formula (2) mentioned above are prepared by executing the reading process of the steps S101, S103 and S105, a process of calculating the steering angle θh is executed in the succeeding step S107 on the basis of the formula (2). Further, the steering angle θh obtained by the step S107 is sent to the VGRS control process 40a, whereby a series of present steering angle computing process is finished.

As described above, in accordance with the vehicle motion control apparatus 20 on the basis of the present embodiment, the steering angle θh of the steering wheel 21 is determined on the basis of the rotation angle θpm of the assist motor 24m detected by the rotation angle sensor 24s and the rotation angle θvm of the gear ratio variable motor 32m detected by the rotation angle sensor 32s, and the VGRS control process 40a of the gear ratio variable mechanism 32 is executed on the basis of the determined steering angle θh. Accordingly, since the steering angle θh of the steering wheel 21 is determined on the basis of the rotation angle θvm used for the VGRS control process 40a of the gear ratio variable mechanism 32 and the rotation angle θpm used for the EPS control process 30a of the EPS actuator 24 (the assist motor 24m), it is possible to obtain the steering angle θh of the steering wheel 21 without the steering angle sensor 26 shown in FIG. 4. Accordingly, since the steering angle sensor 26 can be abolished it is possible to reduce the number of the parts.

Further, in accordance with the vehicle motion control apparatus 20 on the basis of the present embodiment, the rotation angle θpm of the assist motor 24m is detected by the step S101, the rotation angle θvm of the gear ratio variable motor 32m is detected by the step S103, and the steering angle θh of the steering wheel 21 is determined on the basis of the rotation angle θpm and the rotation angle θvm by the step S107. Further, the VGRS control process 40a of the gear ratio variable mechanism 32 is executed on the basis of the steering angle θh determined by the step S107. Accordingly, since the steering angle θh of the steering wheel 21 is determined on the basis of the rotation angle θvm used for the VGRS control process 40a of the gear ratio variable mechanism 32 and the rotation angle θpm used for the EPS control process 30a of the EPS actuator 24 (the assist motor 24m), it is possible to obtain the steering angle θh of the steering wheel 21 without the steering angle sensor 26 shown in FIG. 4. Therefore, since the steering angle sensor 26 can be abolished, it is possible to reduce the number of the parts.

Further, in the vehicle motion control apparatus 20 in accordance with the present embodiment, the output of the steering angle sensor 26 is not used for the VGRS control process 40a as is different from the conventional vehicle motion control apparatus 100 shown in FIG. 4. Accordingly, a response of a control loop of the gear ratio variable mechanism 32 is lowered on the basis of a reduction in a resolution of a current command value, for example, generated in the case that the steering angle sensor 26 employs the steering angle sensor having a low resolution for the detection angle, and it is possible to inhibit a vibration of the steering wheel 21 from being generated due to a response delay.

Since the gear ratio obtained by multiplying the gear ratio generated by the ball screw interposing between the output shaft of the assist motor 24m and the rack shaft, by the gear ratio generated by the pinion gear engaged with the rack of the rack shaft serves as the reduction gear interposing in the input side of the rotation angle sensor 24s, the rotation angle θpm is input to the rotation angle sensor 24s detecting the rotation angle θpm of the assist motor 24m via the reduction gear. Accordingly, since it is possible to improve the resolution of the input rotation angle θpm, the steering angle θh of the steering wheel 21 can be determined on the basis of the rotation angle θpm having the high resolution in the step S107, and the resolution of the determined steering angle θh can be improved. Therefore, since the VGRS control process 40a of the gear ratio variable mechanism 32 is executed on the basis of the steering angle θh of the steering wheel 21 having the high resolution, it is possible to improve the motion control performance of the vehicle.

Further, since a reduction gear 32g of the gear ratio variable mechanism 32 serves as the reduction gear interposing in the input side of the rotation angle sensor 32s, the rotation angle θvm is input to the rotation angle sensor 32s detecting the rotation angle θvm of the gear ratio variable motor 32m via the reduction gear. Accordingly, since it is possible to improve the resolution of the input rotation angle θvm, it is possible to determine the steering angle θh of the steering wheel 21 on the basis of the rotation angle θvm having the high resolution in the step S107 and it is possible to improve the resolution of the determined steering angle θh. Therefore, since the VGRS control process 40a of the gear ratio variable mechanism 32 is executed on the basis of the steering angle θh of the steering wheel 21 having the high resolution, it is possible to improve the motion control performance of the vehicle.

What is claimed is:

1. A motion control method of a vehicle provided with a transfer ratio variable mechanism for changing a transfer ratio by driving a gear ratio variable motor, and an assist motor assisting a steering force on the basis of a steering torque generated in an output shaft of the transfer ratio variable mechanism, in the middle of a steering transfer system connecting a steering wheel and steered wheels, comprising:

a first step of detecting a rotation angle θpm of said assist motor;

a second step of detecting a rotation angle θvm of said gear ratio variable motor; and a third step of determining a steering angle of said steering wheel on the basis of the rotation angle θpm detected in accordance with said first step and the rotation angle θvm detected in accordance with said second step, wherein said transfer ratio variable mechanism is controlled on the basis of the steering angle of said steering wheel determined in accordance with said third step.

2. A motion control method of a vehicle as claimed in claim 1, wherein the rotation angle is input via a speed reducing means to at least one of the detection of the rotation angle θpm in accordance with said first step and the rotation angle θvm in accordance with said second step.

3. A motion control apparatus of a vehicle provided with a transfer ratio variable mechanism for changing a transfer ratio by driving a gear ratio variable motor, and an assist motor assisting a steering force on the basis of a steering torque generated in an output shaft of the transfer ratio variable mechanism, in the middle of a steering transfer system connecting a steering wheel and steered wheels, comprising:
- a first rotation angle detecting means for detecting a rotation angle θpm of said assist motor;
- a second rotation angle detecting means for detecting a rotation angle θvm of said gear ratio variable motor; and
- a steering angle computing means for determining a steering angle of said steering wheel on the basis of the rotation angle θpm detected by said first rotation angle detecting means and the rotation angle θvm detected by said second rotation angle detecting means, wherein said transfer ratio variable mechanism is controlled on the basis of the steering angle of said steering wheel determined by said steering angle computing means.

4. A motion control method of a vehicle as claimed in claim 3, wherein the rotation angle is input via a speed reducing means to at least one of said first rotation angle detecting means and said second rotation angle detecting means.

* * * * *